(12) United States Patent
Yukawa

(10) Patent No.: US 8,544,510 B2
(45) Date of Patent: Oct. 1, 2013

(54) PNEUMATIC TIRE WITH NOISE REDUCER

(75) Inventor: Naoki Yukawa, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 478 days.

(21) Appl. No.: 12/811,780

(22) PCT Filed: Jan. 22, 2009

(86) PCT No.: PCT/JP2009/050973
§ 371 (c)(1),
(2), (4) Date: Jul. 6, 2010

(87) PCT Pub. No.: WO2009/096312
PCT Pub. Date: Aug. 6, 2009

(65) Prior Publication Data
US 2010/0276049 A1    Nov. 4, 2010

(30) Foreign Application Priority Data

Jan. 29, 2008    (JP) .................................. 2008-018025
May 29, 2008    (JP) .................................. 2008-141372

(51) Int. Cl.
*B60C 5/00*    (2006.01)
*B60C 19/00*    (2006.01)

(52) U.S. Cl.
USPC ......................................... 152/155; 152/450

(58) Field of Classification Search
USPC .................................................. 152/155, 450
See application file for complete search history.

(56) References Cited

U.S. PATENT DOCUMENTS

| | | | | | |
|---|---|---|---|---|---|
| 3,909,906 | A | * | 10/1975 | MacMillan | ................ 29/407.09 |
| 4,865,101 | A | * | 9/1989 | Williams | ................ 152/209.28 |
| 2005/0217777 | A1 | | 10/2005 | Yukawa et al. | |

FOREIGN PATENT DOCUMENTS

| | | | |
|---|---|---|---|
| EP | 667251 | * | 8/1995 |
| EP | 1262309 | * | 12/2002 |
| EP | 1 950 057 A1 | | 7/2008 |
| JP | 62-216803 A | | 9/1987 |
| JP | 63-291708 | * | 11/1988 |
| JP | 2-84320 A | | 3/1990 |
| JP | 2004-291855 A | | 10/2004 |
| JP | 2005-254924 A | | 9/2005 |
| JP | 2006-341681 A | | 12/2006 |
| JP | 2009-28919 A | | 2/2009 |

OTHER PUBLICATIONS

International Search Report, dated Apr. 14, 2009, issued in corresponding international application PCT/JP2009/050973.
Search Report dated Apr. 8, 2013 for European Application No. 09 70 5286.

* cited by examiner

*Primary Examiner* — Justin Fischer
(74) *Attorney, Agent, or Firm* — Birch, Stewart, Kolasch & Birch, LLP

(57) ABSTRACT

Provided is a pneumatic tire with noise reducer, which can reduce the cost for manufacturing a noise reducer and which can keep the effect to suppress cavity resonance. The pneumatic tire with noise reducer 1 comprises a pneumatic tire 3 and a noise reducer 7 attached to a tire cavity surface 6 of the tire. The noise reducer 7 is formed into a ring shape by butting both end faces 12e of elongated sponge material 12 disposed along the tire circumferential direction. In the noise reducer 7, moreover, a butt-joint face 8 formed by butting both of the end faces 12e of the sponge material 12 is a substantive plane.

9 Claims, 11 Drawing Sheets

US 8,544,510 B2

PNEUMATIC TIRE WITH NOISE REDUCER

TECHNICAL FIELD

This invention relates to a pneumatic tire with noise reducer which is capable of suppressing cavity resonance by a noise reducer attached to a tire cavity surface.

BACKGROUND OF THE INVENTION

As a tire noise, a road noise is known, which is generated in a frequency range between about 50 and 400 Hz. This arises principally due to columnar resonance (cavity resonance) occurred in the tire cavity. Thereupon, to reduce such a road noise, the following Patent Document 1 proposes a technique of applying a noise reducer made of sponge material to a tire cavity surface, for example. This noise reducer is formed in a jointless ring shape and is mounted inside the tire cavity in a compressed state.

Patent Document 1: Japanese Unexamined Patent Application
Publication No. 2005-254924.

DISCLOSURE OF THE INVENTION

Problems to be Solved by the Invention

However, the above-described noise reducer for a tire has a ring body made of jointless sponge, so that a shaping die is needed for each size of the tires. Therefore, there is a problem of high cost in manufacturing.

It is therefore, in view of the above-mentioned problem, an object of the present invention to provide a pneumatic tire with noise reducer which is capable of reducing cost to manufacture a not se reducer while keeping suppressive effect of the cavity resonance.

Means for Solving the Problem

The present invention is related to a pneumatic tire with noise reducer comprising a pneumatic tire and a noise reducer attached to a tire cavity surface of the tire, characterized in that the above-mentioned noise reducer is formed in a ring shape by butting both end faces of an elongated sponge material disposed along the tire circumferential direction, and a butt-joint face of the above-mentioned end faces is a substantive plane.

The above-mentioned butt-joint face may form a part of a tire meridian section including a tire rotational axis, for example. Additionally, the above-mentioned butt-joint face may be inclined with respect to a reference surface forming a part of the tire meridian section including the tire rotational axis. In this case, it is preferable that the above-mentioned butt-joint face is inclined, for example, around a tire axial-directional line on the reference surface and/or a tire radial-directional line on the reference surface with respect to the above-mentioned reference surface.

Moreover, the above-mentioned noise reducer may be provided on a side of an inner circumferential surface with an indication specifying an attaching direction to the tire cavity surface.

Subsequently, the above-mentioned noise reducer may be made of a number of elongated sponge materials so as to have two or more of the above-mentioned butt-joint faces.

Moreover, an overall length of the elongated sponge material making up the above-mentioned noise reducer is preferably formed longer before being attached to the tire cavity surface than an inner circumference length of the tire.

Effect of the Invention

In the pneumatic tire with noise reducer according to the present invention, the noise reducer is mounted on the tire cavity surface. This noise reducer is formed in a ring shape by butting both end faces of the elongated sponge material disposed along the tire circumferential direction. Such a noise reducer can be easily made from sponge material and the like which is made by cutting the continuously-formed sponge material into a necessary length, for example. Therefore, the suppressive effect of cavity resonance can be kept, and manufacturing costs can be significantly reduced compared with the noise reducer formed in a jointless ring shape. Moreover, in the noise reducer, the butt-joint face made by butting both of the above-mentioned end faces is a substantive plane. It is therefore not necessary to perform a complex cut process, end-face process, and the like, so that the manufacturing process of the sponge material can be simplified, and the costs can be much more reduced.

BRIEF EXPLANATION OF THE DRAWING

FIG. 1 is a cross-sectional view showing a pneumatic tire with noise reducer of an embodiment.

FIG. 2 is a cross-sectional view taken along the tire equator showing the pneumatic tire with noise reducer.

FIG. 10 is a partial cross-sectional view showing the noise reducer comprising an indication.

FIG. 11 is a perspective view showing the noise reducer of another embodiment.

EXPLANATION OF THE REFERENCE

Figure 1:
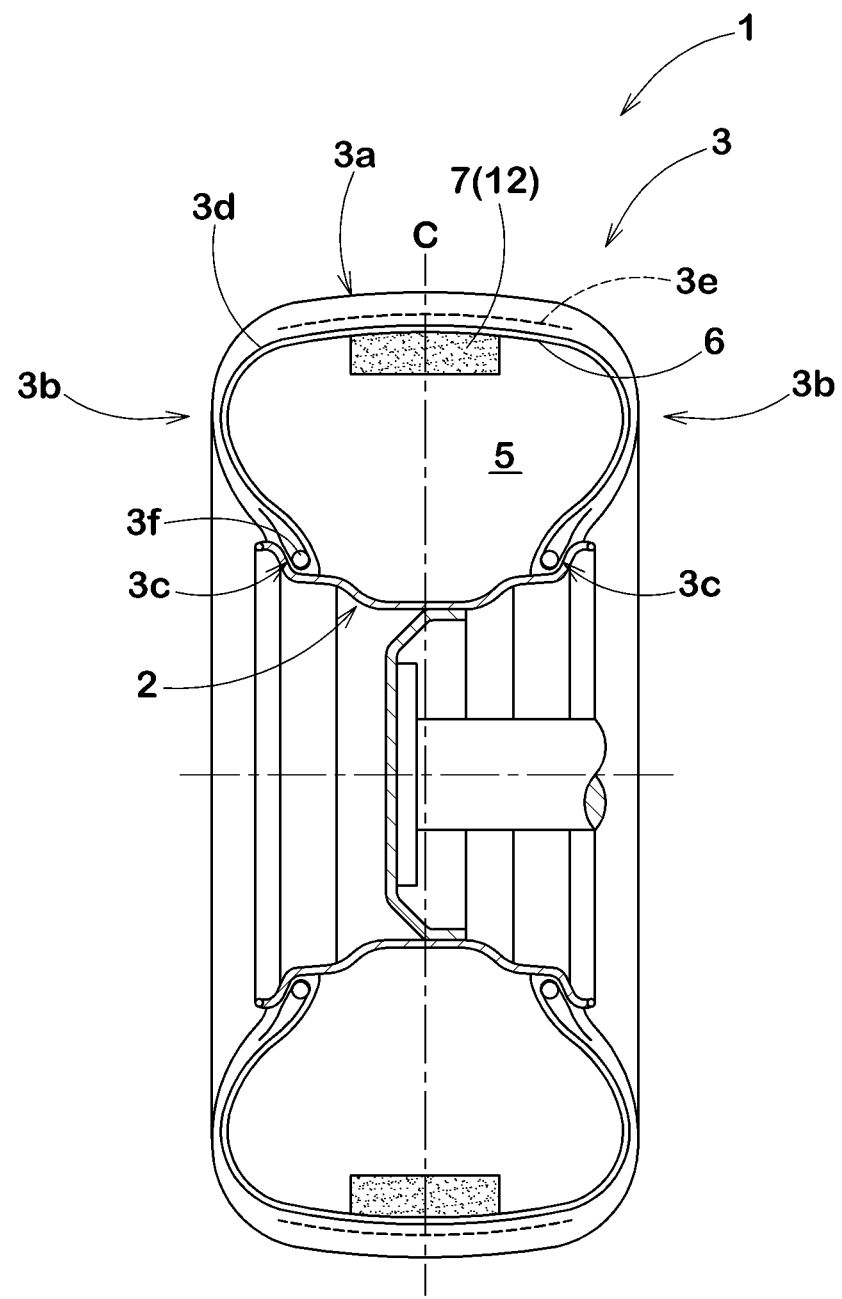
[FIG. 1]

1 Pneumatic tire with noise reducer
3 Pneumatic tire
7 Noise reducer
8 Butt-joint face
12 Sponge material
12e End face of sponge material
Ds Reference surface

BEST MODE FOR CARRYING OUT THE INVENTION

Hereinafter, embodiments of the present invention will be described with referent to the drawings.

Figure 2:
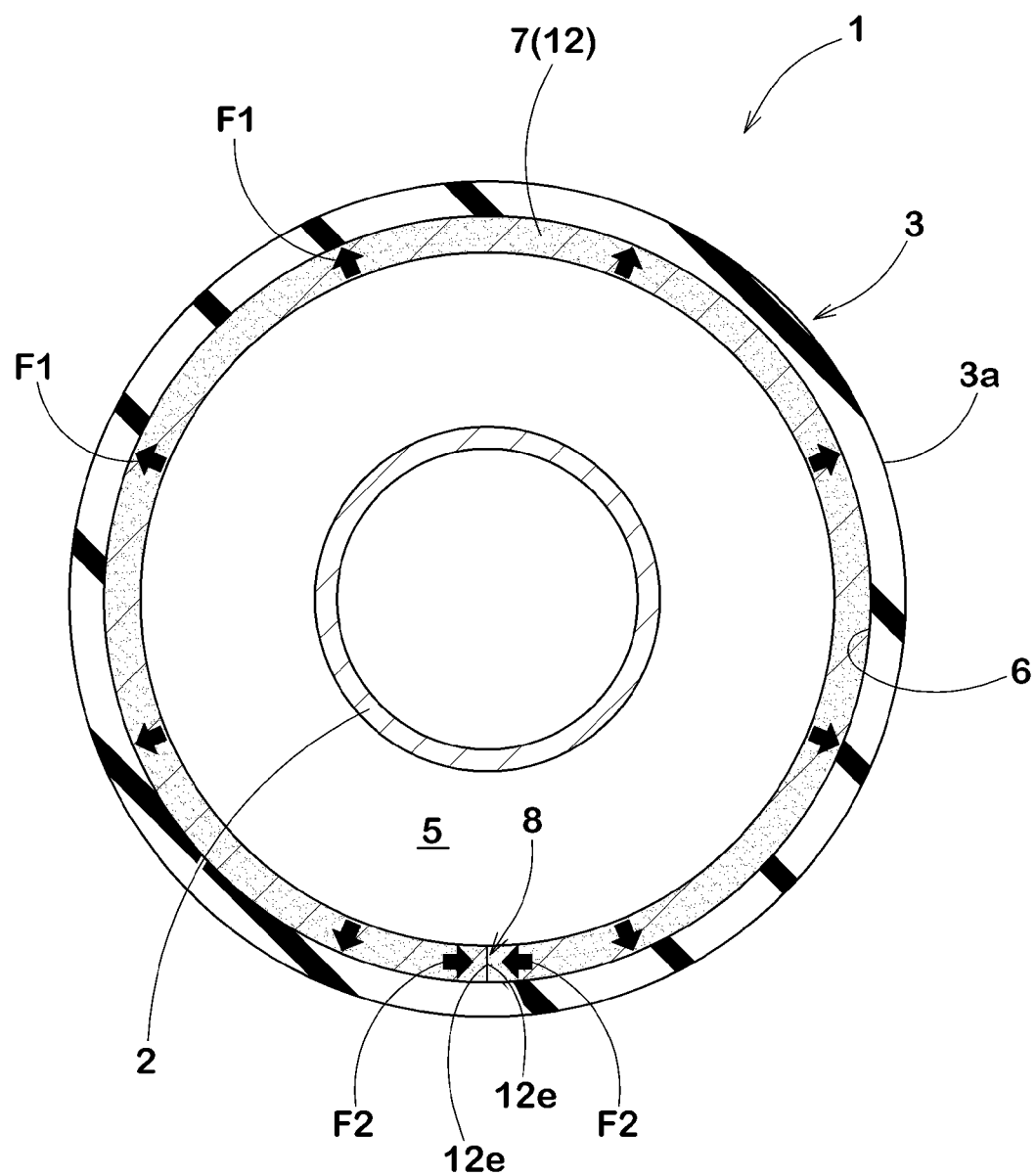
[FIG. 2]

As an embodiment of the present invention, FIG. 1 is a cross-sectional view showing a pneumatic tire with noise reducer 1, and FIG. 2 is a cross-sectional view taken along the tire equator C showing the pneumatic tire, respectively.

The above-mentioned pneumatic tire with noise reducer 1 comprising a pneumatic tire (hereinafter, may be simply called a "tire") 3 and a noise reducer 7 attached to a tire cavity surface 6 of the tire.

The above-mentioned tire 3 comprises a troidal carcass 3d extending from a tread position 3a through respective sidewall portions 3b to bead cores 3f of bead portions 3c, and a belt layer 3e disposed outside the carcass in the radial direction of the tire. When the tire 3 is mounted on a rim 2 (in other word, an assembly of tire mounted on a rim), a tire cavity 5 is surrounded by the tire cavity surface 6 and an outer surface of the wheel rim. Meanwhile, in the present embodiment, the tire 3 is a radial tire for a passenger car for which improving noise reduction performance is eagerly anticipated.

Figure 3A:
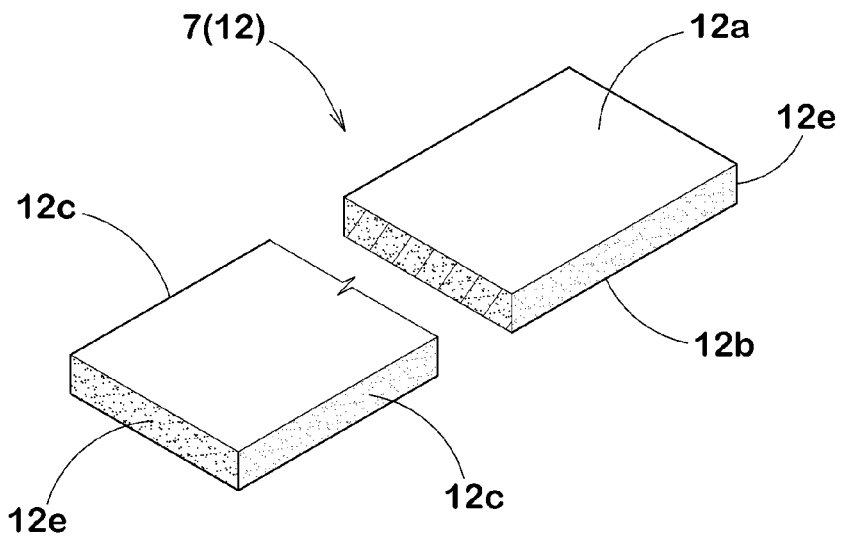
[FIG. 3] FIG. 3($a$) is a partial perspective view of a sponge material, and FIG. 3($b$) is a perspective view of a noise reducer made by forming the sponge material in a ring shape.
Figure 3B:
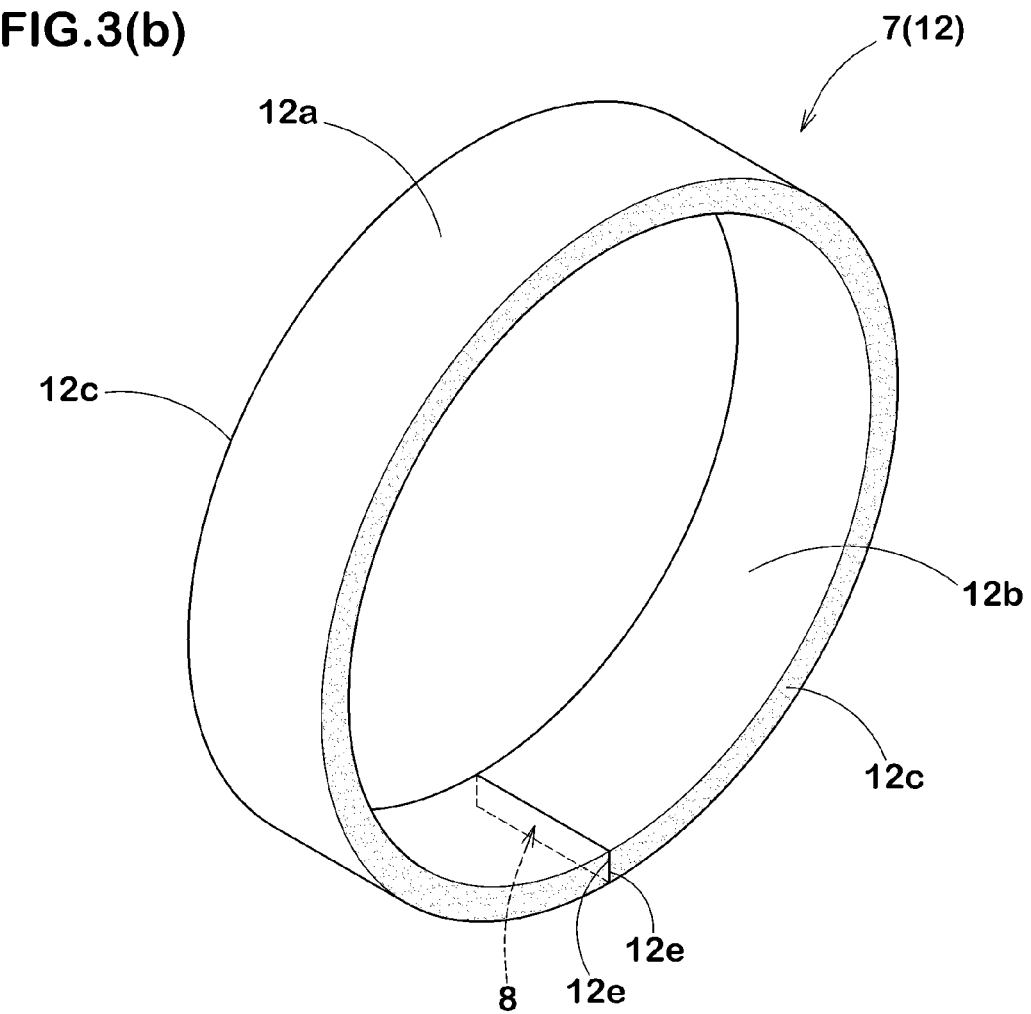

In the above-mentioned noise reducer 7, an elongated sponge material 12 is disposed on the tire cavity surface 6 inside the tread position 3 and is curved along the tire circumferential direction as shown in FIG. 3(a). And, the noise reducer is formed in a ring shape by butting both end faces 12e, 12e of the elongated sponge material as shown in FIGS. 2 and 3(b). The noise reducer 7 is attached to the tire cavity surface 6 on which a center of the axial width of the noise reducer 7 is substantially coincident with the tire equator C. Incidentally, a fixing position of the noise reducer 7 can be changed if necessarily.

As shown in FIG. 3(a), the elongated sponge material 12 comprises an outer surface 12a predetermined to face the outer side n the tire radial direction, an inner surface 12b which is the opposite side in the tire radial di reaction, both side surfaces 12c, and end faces 12e in the longitudinal direction. Moreover, each of the surfaces including the end faces 12e is a plane. In the present embodiment, the sponge material 12 is uniform in width and in thickness. The noise reducer 7 is formed by curving the above-mentioned sponge material 12 in a ring shape and by butting both end faces 12e, 12e, so as to form a butt-joint face 8 to have a substantive plane.

The above-described sponge material 12 can be easily obtained by cutting an original member of linear sponge successively-molded in the longitudinal direction into a specific length at right angles to the above-mentioned longitudinal direction, for example. It is not necessary to conduct any complex cutting process and end-portion process. Therefore, reduction in cost of the noise reducer 7 can be significantly achieved. Moreover, in the noise reducer 7, the above-mentioned end faces 12e, 12e of the sponge material 12 are planes in the same shape with each other and can be cohered together, thereby forming easily the noise reducer into a continuous ring shape and raising productivity. Therefore, in the pneumatic tire with noise reducer 1 of the present invention, the suppressive effect of cavity resonance can be kept as is conventionally done while achieving the reduction in manufacturing cost of the noise reducer 7 significantly.

Figure 11:
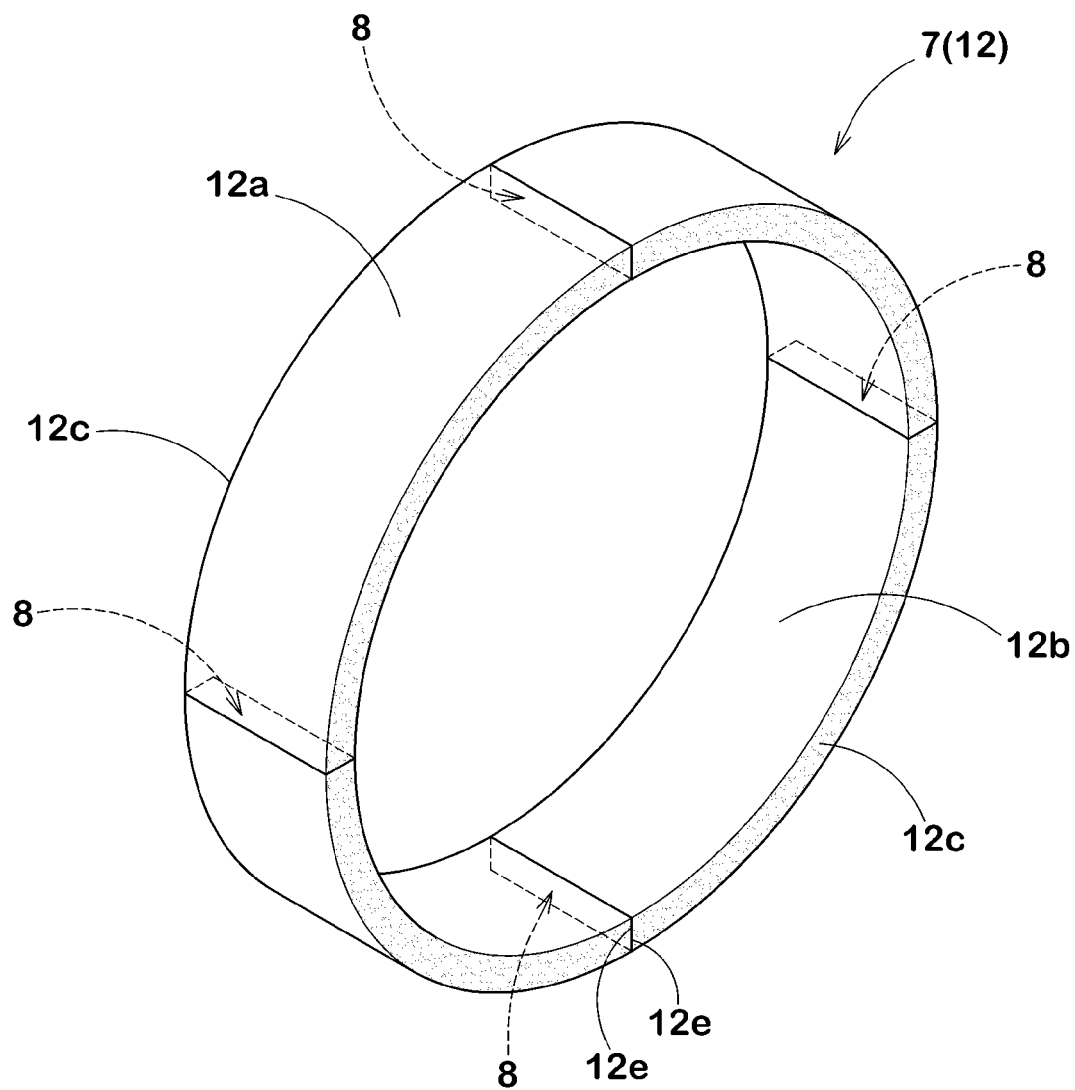
[FIG. 11]

The noise reducer 7 of above-mentioned embodiment is made of a single elongated sponge material 12. However, the noise reducer can be made of the sponge materials 12, which are shorter in the circumferential direction, by butting each other in the tire circumferential direction to form into a ring shape include two or more butt-joint faces 8 as shown in FIG. 11, for example. In such an aspect, a size per sponge material 12 can be decreased, and portability as a part and ease of storage can be improved.

The noise reducer 7 of the present embodiment is a horizontally-long rectangle in cross-sectional shape on the tire meridian section including the tire rotational axis. The cross-sectional shape of the noise reducer 7 may be a trapezoidal shape and the like in which a width of the noise reducer is tapered toward an inside in the tire radial direction. Furthermore, the cross-sectional shape of the noise reducer 7 may be different from these shapes.

The sponge material 12 comprising the above-mentioned noise reducer 7 preferably has continuous bubbles and/or independent bubbles made by foaming rubber or resin, for example. Such a sponge material has high vibration absorption and high sound absorbability, so that this can absorb effectively sound energy occurred in the tire cavity 5, thereby surely reducing the road noise. Also, for a sponge material, as not especially limited, it is preferable to use ether-based polyurethane sponge in view of noise suppressing performance, weight reduction, ease of conditioning of foaming, durability and the like. Moreover, the specific gravity of the sponge material 12 is preferably set in a range of 0.005 to 0.060. Such a sponge material with a low specific gravity can reduce the tire weight, can suppress deterioration of the tire balance, and can increase porosity, thereby improving excellent sound absorbability.

Furthermore, the above-mentioned noise reducer 7 at a longitudinal state before being attached to the tire cavity surface 6 has an overall length longer than an inner circumferential length of the tire cavity surface 6 at a position where the noise reducer 7 is attached. In this way, the noise reducer 7 is attached to the tire cavity surface 6 in a compressed state. Therefore, as shown in FIG. 2, there are generated on the butt-joint face 8 of the noise reducer 7 a circumferential forth F2 by which the end faces 12e, 12e impress with each other and a radial forth F1 directing toward the tire cavity surface 6. This can make adhesiveness between the noise reducer 7 and the tire cavity surface 6 improve. It is useful in preventing misalignment and the like of the noise reducer 7 from the tire cavity surface 6 when transporting or rolling of the pneumatic tire with noise reducer 1.

When the overall length of the above-mentioned noise reducer 7 before being attached to the tire cavity surface 6 is much longer than the inner circumferential length of the tire cavity surface 6, the noise reducer 7 will be excessively compressed at the time of mounding on the tire, and it is possible to get wrinkled and the like. However, when the overall length is greatly small, adhesiveness between the not se reducer 7 and the tire cavity surface 6 deteriorates, and the noise reducer may possibly go off. From the viewpoint of this, the overall length of the noise reducer 7 before being attached is preferably not less than 1.0 times, more preferably not less than 1.01 times, and is preferably not more than 1.1 times, more preferably not more than 1.05 times the inner circumferential length of the tire cavity 6.

Figure 4A:
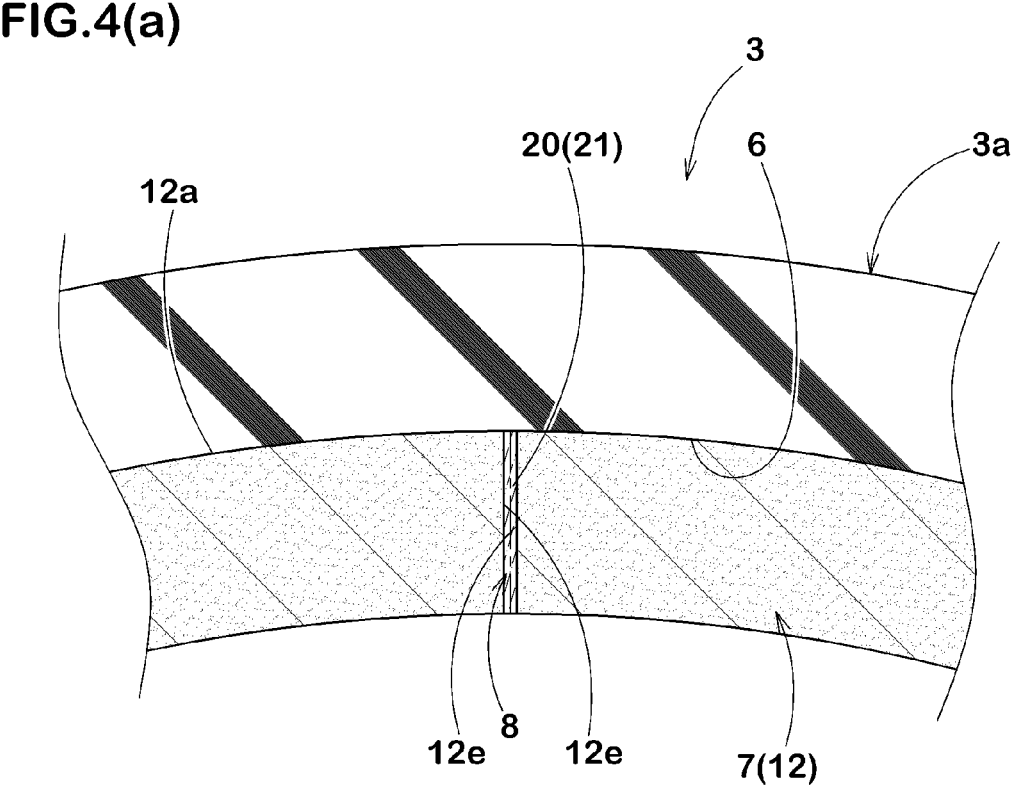
[FIG. 4] FIG. 4($a$) is a partial cross-sectional view enlarging a neighborhood of a butt-joint face of the noise reducer, and FIG. 4($b$) is a partial cross-sectional view enlarging the neighborhood of the butt-joint face of the noise reducer showing another embodiment.

The end faces 12e, 12e of the noise reducer 7 are preferably fixed together as shown in an enlarged view of FIG. 4(a). This improves joining force between the end faces 12e, 12e together in the noise reducer 7, so that damages and the like are prevented. For the above-mentioned means for fixing, a double-faced tape 20 and/or an adhesive agent 21 and the like are preferably used, for example. From the standpoint of production efficiency, the double-faced tape 20 is more desirable.

For the above-mentioned double-faced tape 20, acrylic adhering agent is preferably used. The above-mentioned adhesive agent 21 is preferably made of isocyanate compound or isocyanate terminated prepolymer which can adhere strongly sponge material, specifically ether-based polyurethane sponge material. However, when the end faces 12e are not directly butted together such as the double-faced tape and the like mediating therebetween, the above-mentioned butt-joint face 8 is defined as an intermediate face between the end faces 12e, 12e.

Figure 5A:
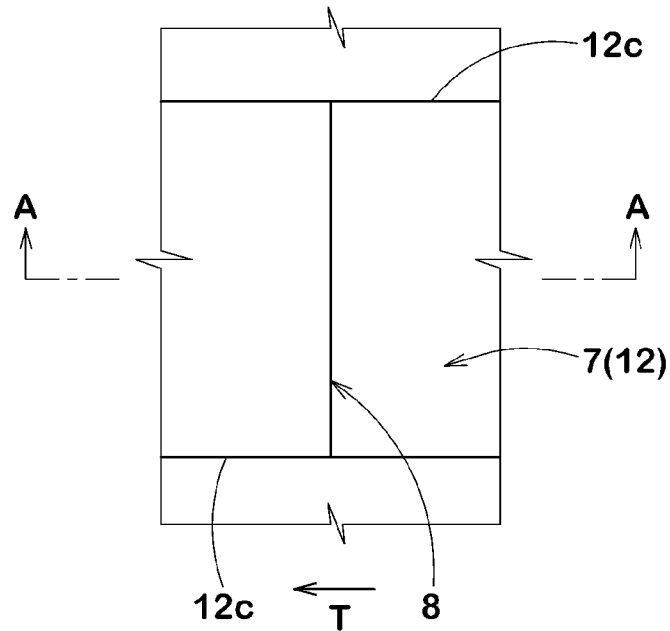
[FIG. 5] FIG. 5($a$) is a front view showing a joint of the noise reducer of the present embodiment, FIG. 5($b$) is a cross-sectional view of the joint of the noise reducer taken along a line A-A, and FIG. 5($c$) is a partial perspective view of the joint portion of the noise reducer.
Figure 5B:
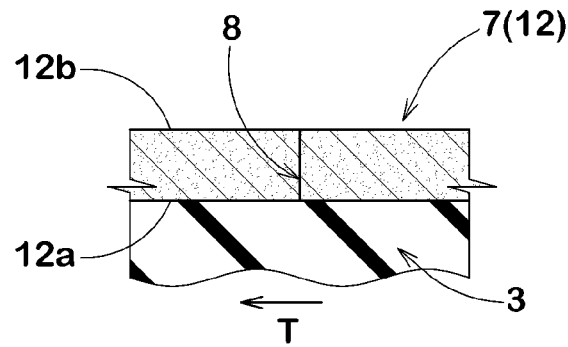
Figure 5C:
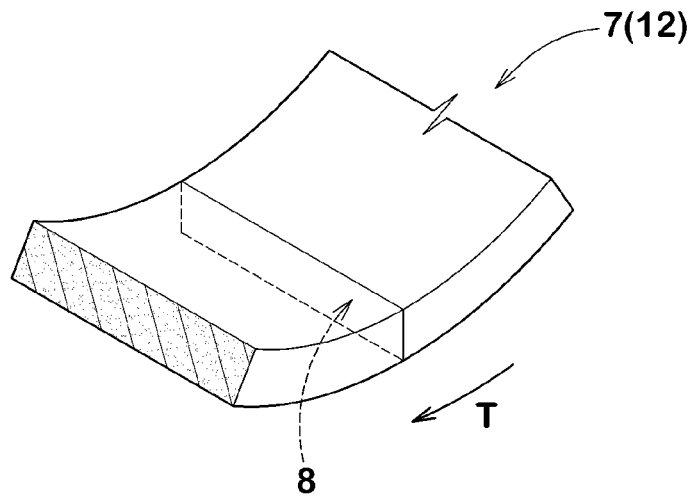

FIG. 5(a) is a front view showing the joint portion of the noise reducer 7 of the present embodiment as viewed from a side of the tire cavity; FIG. 5(b) is a cross-sectional view showing the joint portion of the noise reducer taken along a line A-A; and FIG. 5(c) is a partial perspective view of the joint portion of the noise reducer 7. The butt-joint face 8 of this embodiment is substantially equal to the tire meridian section including the tire rotational axis. It is preferable that such a butt-joint face can be easily made by cutting the end face 12e of the sponge material 12 at a right angle to the longitudinal direction and is extremely easily-worked. The butt-joint face also preferable to butt easily the end faces 12e, 12e together.

Figure 6A:
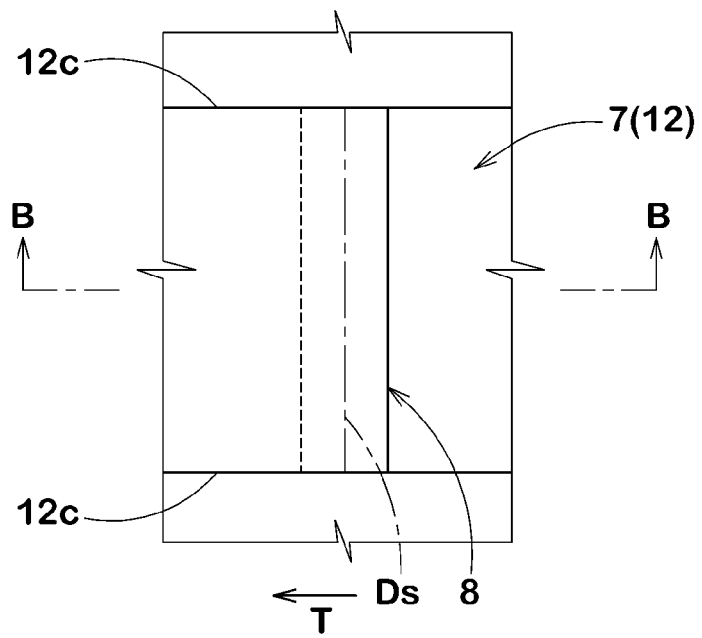
[FIG. 6] FIG. 6($a$) is a front view showing a joint of the noise reducer of another embodiment, FIG. 6($b$) is a cross-sectional view of the joint of the noise reducer taken along a line B-B, and FIG. 6($c$) is a partial perspective view of the joint portion of the noise reducer.
Figure 6B:
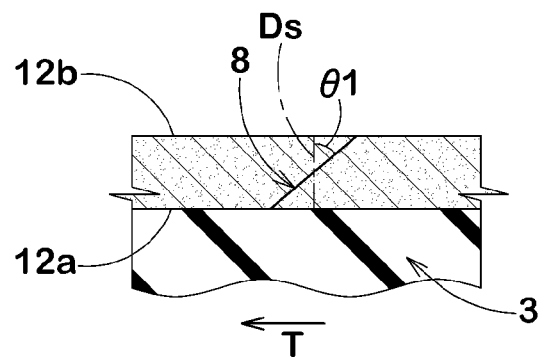
Figure 6C:
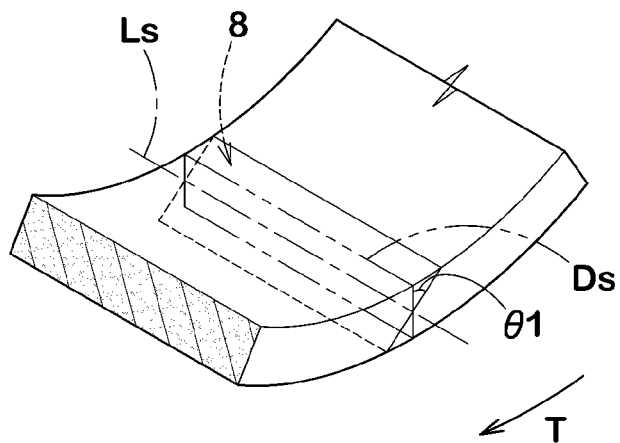
Figure 8A:
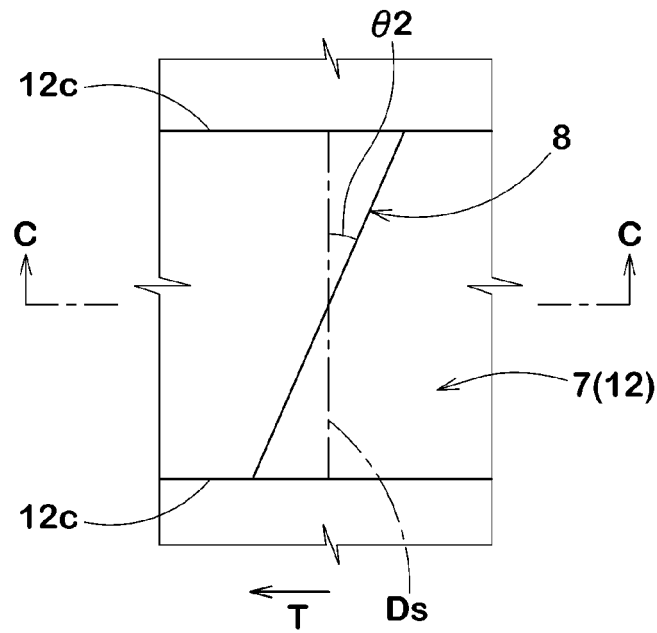
[FIG. 8] FIG. 8($a$) is a front view of showing a joint of the noise reducer of another embodiment, FIG. 8($b$) is a cross-sectional view of the joint of the noise reducer taken along a line C-C, and FIG. 8($c$) is a partial perspective view of the joint portion of the noise reducer.
Figure 8B:
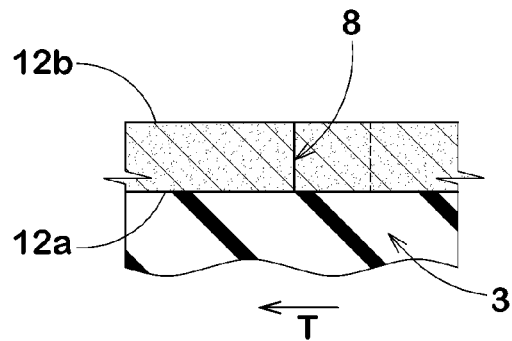
Figure 8C:
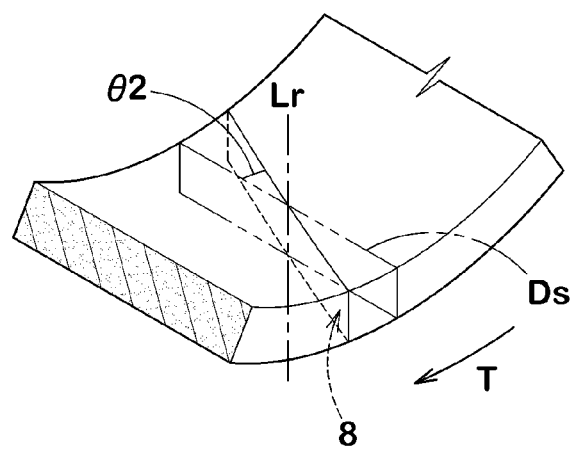
Figure 9A:
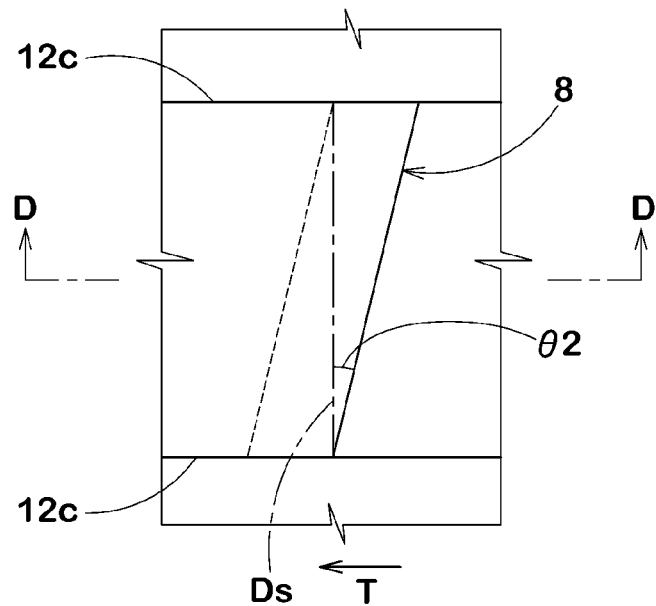
[FIG. 9] FIG. 9($a$) is a front view showing a joint of the noise reducer of another embodiment, FIG. 9($b$) is a cross-sectional view of the joint of the noise reducer taken along a line D-D, and FIG. 9($c$) is a partial perspective view of the joint portion of the noise reducer.
Figure 9B:
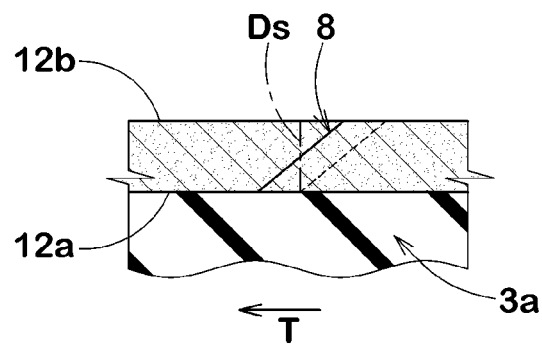
Figure 9C:
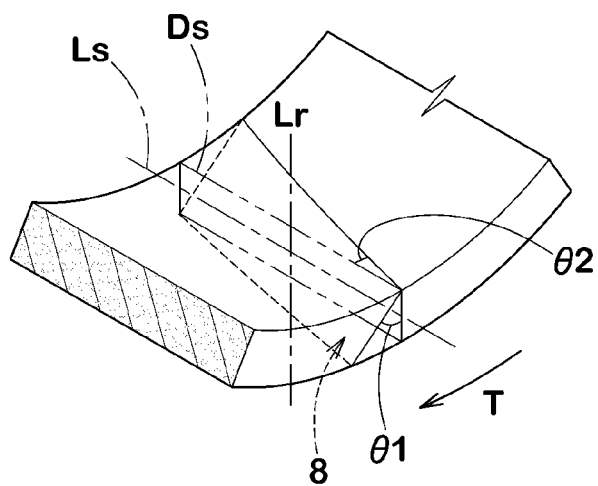

Moreover, the above-mentioned butt-joint face 8 may be inclined with respect to a reference surface Ds forming a part of the tire meridian section including the tire rotational axis such as other embodiments shown in FIGS. 6, 8, and 9. Owing to the butt-joint face 8 inclined with respect to the reference surface Ds, an area of the butt-joint face 8 increases more than an aspect shown in FIG. 5. This makes frictional force acted on the butt-joint face 8 to increase and an adhering area of the butt-joint face larger, and improves the joining force between both of end faces 12e of the sponge material 12. Therefore, it is useful in preventing breakage of the noise reducer 7 and the like. Additionally, the inclined butt-joint face 8 helps to reduce shocks from the tread position 3a along an inclined face, and breakage at the butt-joint face 8 can be inhibited effectively.

In the embodiment as shown in FIG. 6, the butt-joint face 8 of the noise reducer 7 is inclined around a tire axial-directional line Ls on the reference surface Ds with respect to the reference surface Ds, for example. Such a butt-joint face 8 can exert peeling resistance property against especially shocks in the tire radial direction.

Figure 7A:
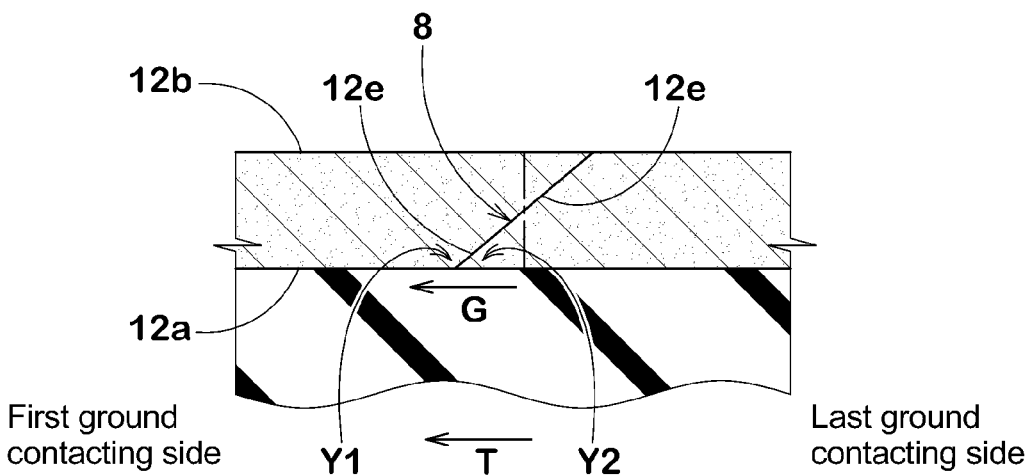
[FIG. 7] FIG. 7($a$) is a cross-sectional view of the noise reducer having the butt-joint face shown in FIG. 6, and FIG. 7($b$) is a cross-sectional view of the noise reducer having the butt-joint face inclined to the last ground contacting side with respect to the tire rotational direction.

Moreover, to improve the durability of the butt-joint face 8, it is preferable to incline the butt-joint face 8 to the first ground contacting side with respective to the tire rotational direction T from an inner surface 12b toward an outer surface 12a in the tire radial direction of the sponge material 12 as shown in the present embodiment. As shown in FIG. 7(a), the noise reducer 7 attached to the tire cavity surface 6 rotates slightly less advanced than a rotation of the tire owing to the friction. Therefore, sharing force G acts on the outer surface 12a of the sponge material 12 attached to the tire cavity surface 6. At this time, a corner portion Y1 between the end face 12e and the outer surface 12a of the sponge material 12 positioned on the first ground contacting side with respect to tire rotational di reaction T is an obtuse angle, so that the corner portion Y1 has a high rigidity and can keep its shape without deformation while being subjected to the above-mentioned shearing force G in the same direction of the tire rotational direction T. Additionally, a corner portion Y2 between the end face 12e and the outer surface 12a of the sponge material 12 positioned on the last ground contacting side is an acute angle, so that the corner portion Y2 has a low rigidity. However, the corner portion Y2 is pulled toward the butt-joint face 8 by the shearing force G, so that any separation at the butt-joint face 8 does not occur.

Figure 7B:
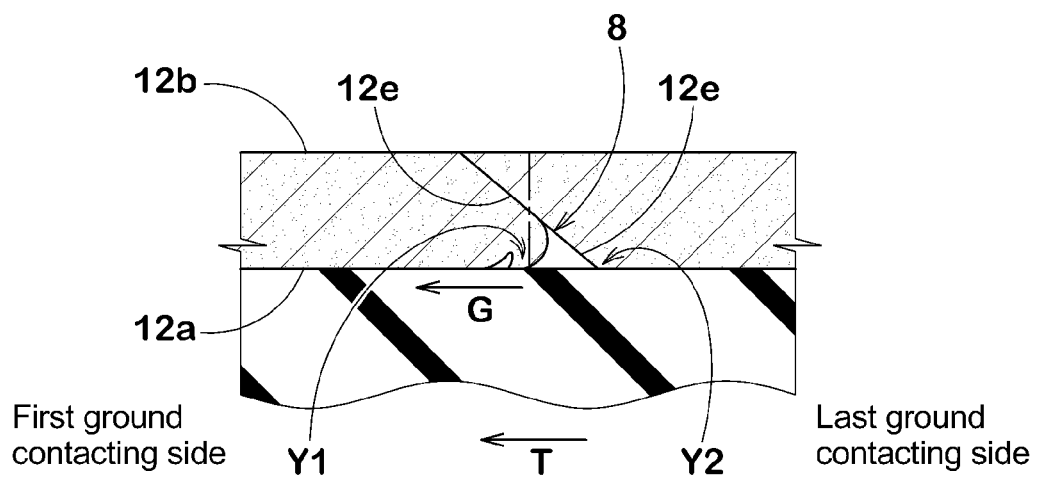

In contrast, as shown in FIG. 7(b), when the butt-joint face 8 is inclined to the last ground contacting side with respect to the tire rotational di reaction T, the corner portion Y1 on the first ground contacting side becomes an acute angle, and the rigidity decreases. Due to that, this portion is separated from the butt-joint face 8 by the above-mentioned shearing force G and gets into a so-called "hangnail"; therefore, it is not preferable.

An angle $\theta 1$ between the above-mentioned butt-joint face 8 and the reference surface Ds is preferably more than 0 deg. and not more than 85 deg. when the above-mentioned angle $\theta 1$ is 0 deg., the area of the butt-joint face 8 does not increase too much. When the above-mentioned angle $\theta 1$ is too large, the area of the end faces 12e, 12e becomes excessively large, thereby making the cutting process thereof and the like complicated. Moreover, the end faces 12e, 12e become slippery when butting, and it may possibly cause decrease in efficiency when attaching function of the noise reducer 7. From these viewpoints, the above-mentioned angle $\theta 1$ is preferably not less than 5 deg., more preferably not less than 30 deg., and is preferably not more than 70 deg., more preferably not more than 60 deg.

Moreover, in the embodiment shown in FIG. 8, the butt-joint face 8 of the noise reducer 7 inclines only around the tire radial-direction line Lr on the reference surface Ds with respect to the reference surface Ds. It is preferable that such a butt-joint face 8 can exert high peeling resistance property against the shock from the tire axial direction. And, an angle $\theta 2$ between the above-mentioned butt-joint face 8 and the reference surface Ds is preferably more than 0 deg. not more than 60 deg. when the above-mentioned angle $\theta 2$ is 0 deg., the area of the butt-joint face 8 does not increase too much. When the above-mentioned angle $\theta 2$ is over 60 deg., the cutting process and the like of the sponge material 12 becomes complicated, and manufacturing cost may possibly increase. Moreover, an adhering area between the end faces 12e, 12e becomes extremely large when butting, and it may possibly cause decrease in efficiency when attaching function of the noise reducer 7. From the viewpoint of this, the above-mentioned angle $\theta 2$ is preferably not less than 5 deg., more preferably not less than 30 deg., and is preferably not more than 50 deg., more preferably not more than 45 deg.

Furthermore, the embodiment shown in FIG. 9, the above-mentioned butt-joint face 8 is inclined around both of the tire axial-directional line Ls and the tire radial-directional line Lr on the reference surface Ds with respect to said reference surface Ds. Such a butt-joint face 8 is preferable in view of exerting in good balance the peeling resistance property against the shocks from the tire axial direction and the tire radial direction. Meanwhile, the above-mentioned preferable ranges of the angles $\theta 1$ and $\theta 2$ are also adapted to that in this embodiment.

Figure 4B:
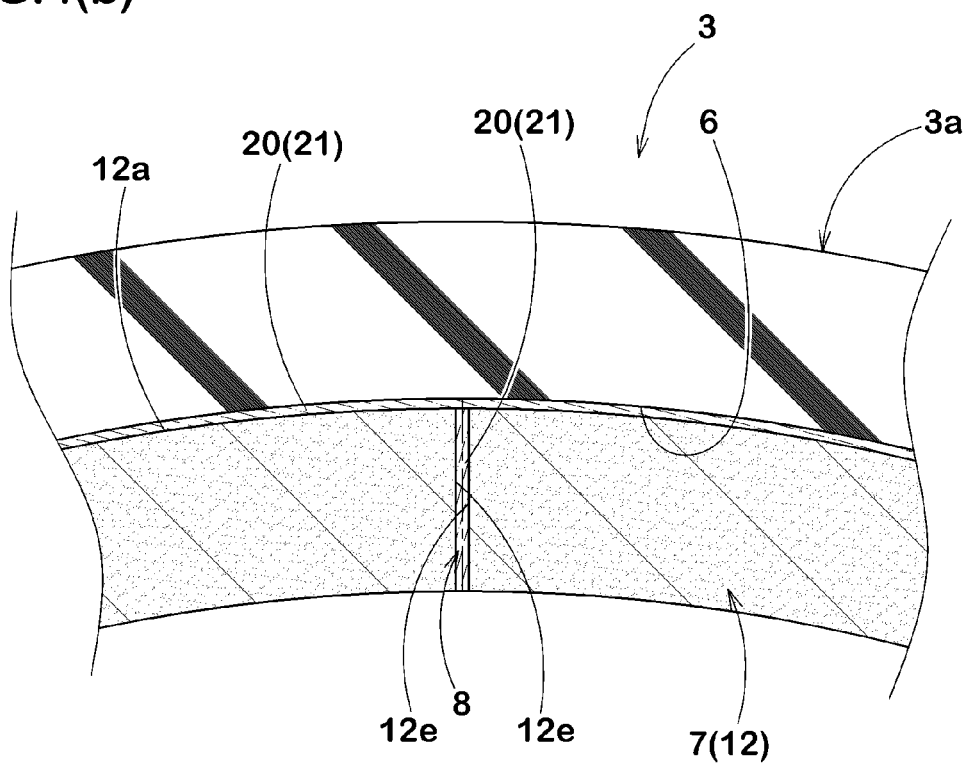

As shown in FIG. 4(b), the outer surface 12a in the tire radial direction of the sponge material 12 comprising the noise reducer 7 may be fixed on the tire cavity surface 6. For a method to fix, the above-mentioned double-faced tape 20 and/or the adhesive agent 21 and the like are preferably used.

Moreover, in such a embodiment, as well as the embodiment shown in FIG. 6, when the butt-joint face 8 is inclined around the tire axial-di reaction line Ls on the reference surface Ds with respect to the reference surface Ds, it is preferable to incline the above-mentioned butt-joint face 8 toward the first ground contacting side with respect to the tire rotational direction T from the inner surface 12b toward the outer surface 12a of the sponge material 12 in the tire radial direction.

Figure 10:
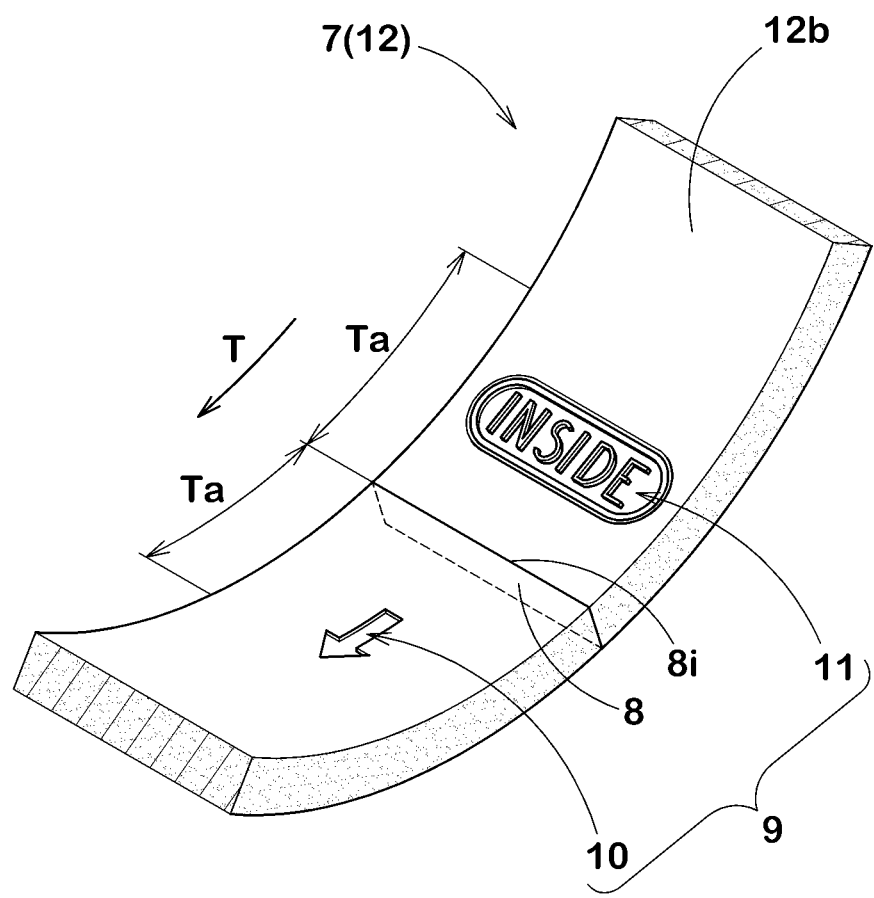
[FIG. 10]

As shown in FIG. 10, it is preferable that the noise reducer 7 is provided on a side of the inner circumferential surface (a side of the inner surface 12b) in the tire radial direction with an indication 9 indicating its attaching direction to the tire cavity surface 6.

The indication 9 of the present embodiment includes a first indication 10 indicating the rotational direction of the sponge material 12, and a second indication 11 indicating the side of the inner surface 12b of the sponge material 12 to conform the noise reducer to the predetermined tire rotational direction T. Incidentally, it may include any one of them.

The above-mentioned first indication 10 comprises a mark such as an arrow and the like indicating a rotational di reaction, and the second indication 11 comprises letters that denote an inner side ("INSIDE", for example) and patterns and the like, for example. Such a indication 9 is useful in correctly applying the noise reducer so as to an inclining di reaction of the butt-joint face 8 faces the right direction with respect to a rotational direction of the tire and in preventing errors in attaching when the butt-joint face 8 of the noise reducer 7 inclines as an aspect shown in FIG. 6 or FIG. 9, for example.

Also, the indication 9 can be provided not only on the inner surface 12b of the sponge material 12 but also on the outer surface 12a. Incidentally, as shown in the present embodiment, when the indication is provided on the side of the inner surface 12b, it is preferable to check whether a state of attaching is right or wrong after an attachment of the noise reducer 7. Moreover, when the indication 9 comprises three-dimensional convexo-concave patterns, it is preferable that a position of the indication 9 is confirmable promptly not only with the naked eye but also with hand feeling in attaching function. Also, there are various methods to provide the above-mentioned indication 9 on the noise reducer 7 such as branding, printing, sticker, and/or embossment, for example.

The above-mentioned indication 9 is preferably provided near to the butt-joint face 8, for example, in both regions Ta situated within 40 cm from the butt-joint face in the tire circumferential direction, respectively. To provide the indication 9 near the butt-joint face 8 in this way makes it possible a worker to confirm the indication 9 at the same time as butting the above-mentioned end faces 12 together when attaching the noise reducer 7 on the tire 3. Meanwhile, the above-mentioned region Ta is a region within 40 cm in the tire circumferential direction from a boundary line 8i between the inner surface 12b of the sponge material 12 and the butt-joint face 8. When the boundary line 8i of the butt-joint face 8 inclines with respect to the tire axial direction as shown in FIGS. 8 and 9, it is defined as a distance from the midpoint of the boundary line 8i.

Hereinbefore, an especially preferred embodiment of the present invention was described, but it will be obvious that various changes may be made without limitation to the embodiments shown in the drawings.

EXAMPLES

Noise reducers were manufactured for trial based on a specification shown in Table 1, and were tested their properties. In Comparative Example 1, used was a jointless noise reducer, which was formed in a ring shape. In Comparative Example 2, used was a noise reducer in which end faces of a sponge material were not butted but separated. In Comparative Example 3, used was a noise reducer in which end faces of a sponge material were in a convexo-concave state, and a butt-joint face was also in a convexo-concave state.

Common specification was as follows:
  Tire size: 215/45R17
  Rim size: 17×7jj
  Inner pressure: 200 kPa
  Specification of noise reducer:
    Material: Ether-based polyurethane sponge (Type E16, MARUSUZU CO., LTD)
    Specific gravity: 0.016
    Cross sectional shape: Horizontally long rectangle with 100 mm in width×20 mm in thickness
    Method of fixing a butt-joint face: Both end faces of elongated sponge material were patched together with a double-side adhesive tape (50 mm in width, item number 468MP, Sumitomo 3M Limited) so as to be a ring shape.
    Method of fixing a tire cavity surface (Example 12 only): To fix on a tread region with the above-mentioned double-side adhesive tape.

<Process Time of Noise Reducer>

The process time that ten sponge materials cut into elongated bodies take to form in respective ring shapes was measured. Meanwhile, an adhesive time to a tire cavity surface was also included when the noise reducer was fixed on the tire cavity surface. The smaller the numeric values are, the higher and the more favorable the efficiency of process is.

<Durability 1>

Each pneumatic tire with noise reducer having twenty butt-joint faces per noise reducer was mounted on the above-mentioned rim. The pneumatic tire was rolled about 20000 km on a drum tester in accordance with the following condition. Presence of separations of the butt-joint face of the noise reducer was checked by the naked eye, and the number of separations were counted. The less the number of separations is, the more preferable the durability is.
  Load: 4.0 kN
  Rolling speed: 100 km/h
  Diameter of drum: 1.7 m <Durability 2>

Each pneumatic tire with noise reducer having a single butt-joint face per noise reducer was mounted on the above-mentioned rim. The pneumatic tire was rolled on the drum tester in accordance with the same condition as the above. Presence of separations of the butt-joint face of the noise reducer was checked by the naked eye once every 1000 km, and a distance at the onset of separation was measured. Evaluation is displayed using indices with the Comparative Example 1 being 100. The larger the numeric value is, the more favorable the durability is.

<Cost of Manufacturing>

Cost of manufacturing (including labor costs) per pneumatic tire with noise reducer having a single butt-joint face was displayed using indices with the Comparative Example 1 being 100. The smaller the numeric value is, the more favorable the cost of manufacturing is.

<Vibration Presence>

Each tire was loaded on a passenger car, and the car ran on an asphalt road smooth surface at the speed of 60 km/h. Presence of vibration while running was confirmed by driver's ear.

<Durability at a Time of Transportation>

A transportation test was conducted as follows: a pneumatic tire with noise reducer not mounted on a rim was rolled about 15 meters to load into a truck box. Then, the pneumatic tire was dropped down from the truck box, rerolled to where it started, and was laid out flat. Thus, thirty tires were tested every Example to check whether attaching condition of the noise reducer to the tire cavity surface was kept alive. When the attaching was alive, the condition was indicated by "OK"; and when the noise reducer came off from the tire cavity surface, the condition was indicated by the number of such tires.

Test results are shown in Table 1.

TABLE 1

| | Com. Example 1 | Com. Example 2 | Com. Example 3 | Example 1 | Example 2 | Example 3 | Example 4 | Example 5 | Example 6 | Example 7 |
|---|---|---|---|---|---|---|---|---|---|---|
| Presence of butt-joint face | None | None | Present | Present | Present | Present | Present | Present | Present | Present |
| Shape of butt-joint face | — | — | Concave-convex | Plane | Plane | Plane | Plane | Plane | Plane | Plane |
| Attaching to tire cavity surface | No | No | No | No | No | No | No | No | No | No |
| Presence of separation between end faces | — | Present | None | None | None | None | None | None | None | None |
| Angle $\theta_1$ [deg.] | — | — | — | 0 | 0 | 0 | 0 | 30 | 60 | 70 |
| Angle $\theta_2$ [deg.] | — | — | — | 0 | 30 | 60 | 70 | 0 | 0 | 0 |
| Overall length A of sponge material [mm] | 1920 | 1850 | 1920 | 1920 | 1920 | 1920 | 1920 | 1920 | 1920 | 1920 |
| Inner circumferential length B of tire cavity [mm] | 1870 | 1870 | 1870 | 1870 | 1870 | 1870 | 1870 | 1870 | 1870 | 1870 |
| Ratio (A/B) | 1.03 | 0.99 | 1.03 | 1.03 | 1.03 | 1.03 | 1.03 | 1.03 | 1.03 | 1.03 |
| Direction of inclination (normal/opposite) of butt-joint face *1 | — | — | — | — | — | — | — | Normal | Normal | Normal |
| Process time of noise reducer [second] | 0 | 0 | 1520 | 130 | 138 | 243 | 355 | 142 | 182 | 254 |
| Durability 1 (the number of separations) | 0 | 10 | 0 | 5 | 3 | 2 | 1 | 0 | 0 | 0 |
| Durability 2 (index) | 100 | 0 | 70 | 20 | 40 | 50 | 60 | 100 | 100 | 100 |
| Cost of manufacturing (index) | 100 | 5 | 90 | 20 | 21 | 23 | 25 | 22 | 22 | 23 |
| Presence of vibration | None | Present | None | None | None | None | None | None | None | None |
| Durability at a time of transportation | OK | 6 | OK | OK | OK | OK | OK | OK | OK | OK |

| | Example 8 | Example 9 | Example 10 | Example 11 | Example 12 | Example 13 | Example 14 | Example 15 | Example 16 | Example 17 |
|---|---|---|---|---|---|---|---|---|---|---|
| Presence of butt-joint face | Present | Present | Present | Present | Present | Present | Present | Present | Present | Present |
| Shape of butt-joint face | Plane | Plane | Plane | Plane | Plane | Plane | Plane | Plane | Plane | Plane |
| Attaching to tire cavity surface | No | No | No | No | Yes | No | No | No | No | No |
| Presence of separation between end faces | None | None | None | None | None | None | None | None | None | None |
| Angle $\theta_1$ [deg.] | 80 | 30 | 30 | 30 | 0 | 45 | 45 | 45 | 60 | 60 |
| Angle $\theta_2$ [deg.] | 0 | 30 | 45 | 60 | 0 | 30 | 45 | 60 | 30 | 45 |
| Overall length A of sponge material [mm] | 1920 | 1920 | 1920 | 1920 | 1870 | 1920 | 1920 | 1920 | 1920 | 1920 |
| Inner circumferential length B of tire cavity [mm] | 1870 | 1870 | 1870 | 1870 | 1870 | 1870 | 1870 | 1870 | 1870 | 1870 |
| Ratio (A/B) | 1.03 | 1.03 | 1.03 | 1.03 | 1.00 | 1.03 | 1.03 | 1.03 | 1.03 | 1.03 |
| Direction of inclination (normal/opposite) of butt-joint face *1 | Normal | Normal | Normal | Normal | — | Normal | Normal | Normal | Normal | Normal |
| Process time of noise reducer [second] | 1066 | 143 | 180 | 268 | 410 | 205 | 255 | 293 | 268 | 293 |
| Durability 1 (the number of separations) | 0 | 0 | 0 | 0 | 0 | 0 | 0 | 0 | 0 | 0 |
| Durability 2 (index) | 100 | 100 | 100 | 100 | 100 | 100 | 100 | 100 | 100 | 100 |
| Cost of manufacturing (index) | 30 | 21 | 22 | 23 | 100 | 22 | 23 | 24 | 23 | 24 |
| Presence of vibration | None | None | None | None | None | None | None | None | None | None |
| Durability at the time of transportation | OK | OK | OK | OK | OK | OK | OK | OK | OK | OK |

| | Example 18 | Example 19 | Example 20 | Example 21 | Example 22 | Example 23 | Example 24 | Example 25 | Example 26 |
|---|---|---|---|---|---|---|---|---|---|
| Presence of butt-joint face | Present | Present | Present | Present | Present | Present | Present | Present | Present |
| Shape of butt-joint face | Plane | Plane | Plane | Plane | Plane | Plane | Plane | Plane | Plane |
| Attaching to tire cavity surface | No | No | No | No | No | No | No | No | No |
| Presence of separation between end faces | None | None | None | None | None | None | None | None | None |
| Angle $\theta_1$ [deg.] | 60 | 60 | 0 | 0 | 0 | 0 | 0 | 0 | 0 |
| Angle $\theta_2$ [deg.] | 60 | 0 | 0 | 0 | 0 | 0 | 0 | 0 | 0 |

TABLE 1-continued

| | | | | | | | | | |
|---|---|---|---|---|---|---|---|---|---|
| Overall length A of sponge material [mm] | 1920 | 1920 | 1870 | 1955 | 2010 | 2055 | 2100 | 1820 | 1750 |
| Inner circumferential length B of tire cavity [mm] | 1870 | 1870 | 1870 | 1870 | 1870 | 1870 | 1870 | 1870 | 1870 |
| Ratio (A/B) | 1.03 | 1.03 | 1.00 | 1.05 | 1.07 | 1.10 | 1.12 | 0.97 | 0.94 |
| Direction of inclination (normal/opposite) of butt-joint face *1 | Normal | Opposite | — | — | — | — | — | — | — |
| Process time of noise reducer [second] | 343 | 182 | 130 | 130 | 130 | 130 | 130 | 130 | 130 |
| Durability 1 (the number of separations) | 0 | 8 | 5 | 5 | 5 | 5 | 5 | 5 | 5 |
| Durability 2 (index) | 100 | 20 | 20 | 20 | 20 | 20 | 20 | 20 | 20 |
| Cost of manufacturing (index) | 25 | 22 | 20 | 20 | 20 | 20 | 20 | 20 | 20 |
| Presence of vibration | None | None | None | None | None | None | None | None | None |
| Durability at the time of transportation | OK | OK | OK | OK | OK | OK | *2 | 4 | 8 |

*1 A direction of "normal" represents that a butt-joint face is formed to incline to a first ground contacting side with respect to the tire rotational direction T from an inner surface toward an outer surface of a sponge material in the radial direction of a tire as an aspect shown in FIG. 6 or 8. A direction of "opposite" represents that the butt-joint face is formed to incline to a last ground contacting side.
*2 Wrinkles and folds occur.

According to the tests, it was found that the pneumatic tire with noise reducer used in Examples could reduce manufacturing cost of the noise reducer and could suppress vibration while running. Moreover, according to measurement of the vibration while running, it was also confirmed that the pneumatic tire with noise reducer could keep the suppressive effect of cavity resonance.

The invention claimed is:

1. A pneumatic tire with noise reducer comprising a pneumatic tire and a noise reducer attached to a tire cavity surface of the tire, characterized in that
said noise reducer is formed in a ring shape by butting both end faces of an elongated sponge material disposed along the tire circumferential direction and said noise reducer is provided on an inner circumferential surface with an indication specifying an attaching direction to the tire cavity surface, and
a butt-joint face of said end faces is a substantive plane, wherein said indication includes a first indication which indicates a rotational direction of the noise reducer.

2. The pneumatic tire with noise reducer as set forth in claim 1, wherein said butt-joint face forms a part of a tire meridian section including a tire rotational axis.

3. The pneumatic tire with noise reducer as set forth in claim 1, wherein said butt-joint face is inclined with respect to a reference surface forming a part of the tire meridian section including the tire rotational axis.

4. The pneumatic tire with noise reducer as set forth in claim 3, wherein said butt-joint face is inclined around a tire axial-directional line on the reference surface with respect to said reference surface.

5. The pneumatic tire with noise reducer as set forth in claim 3, wherein said butt-joint face is inclined around a tire radial-directional line on the reference surface with respect to said reference surface.

6. The pneumatic tire with noise reducer as set forth in claim 3, wherein said butt-joint face is inclined around both of the tire axial-directional line on the reference surface and the tire radial-directional line on the reference surface with respect to said reference surface.

7. The pneumatic tire with noise reducer as set forth in claim 1, wherein said noise reducer is made of a plural of the elongated sponge materials so as to comprise two or more of said butt-joint faces.

8. The pneumatic tire with noise reducer as set forth in claim 1, wherein the elongated sponge material constituting said noise reducer has an overall length longer than an inner circumferential length of the tire cavity before being attached to the tire cavity surface.

9. A pneumatic tire with noise reducer comprising a pneumatic tire and a noise reducer attached to a tire cavity surface of the tire, characterized in that
said noise reducer is formed in a ring shape by butting both end faces of an elongated sponge material disposed along the tire circumferential direction and said noise reducer is provided on an inner circumferential surface with an indication specifying an attaching direction to the tire cavity surface, and
a butt-joint face of said end faces is a substantive plane, wherein the tire has a predetermined rotational direction and the indication includes a first indication which indicates a rotational direction of the noise reducer of the noise reducer to conform the noise reducer to the predetermined rotational direction of the tire.

* * * * *